(Model.)

J. H. BAXTER.
APPARATUS FOR PACKING DRIED FISH.

No. 261,984. Patented Aug. 1, 1882.

WITNESSES:

INVENTOR:
J. H. Baxter
BY Munn & Co.
ATTORNEYS.

UNITED STATES PATENT OFFICE.

JAMES H. BAXTER, OF PORTLAND, MAINE, ASSIGNOR TO HIMSELF AND CHARLES A. DYER AND DAVID L. FERNALD, BOTH OF SAME PLACE.

APPARATUS FOR PACKING DRIED FISH.

SPECIFICATION forming part of Letters Patent No. 261,984, dated August 1, 1882.

Application filed May 31, 1882. (Model.)

*To all whom it may concern:*

Be it known that I, JAMES H. BAXTER, of Portland, in the county of Cumberland and State of Maine, have invented a new and useful Improvement in Packing Dried Fish and Apparatus therefor, of which the following is a full, clear, and exact description.

This invention relates to appliances for use in packing fish; and it consists in molds of peculiar construction and operation. These molds, which are made in two longitudinal sections hinged together, and of cylindrical contour on their interior, are constructed with a series of grooves for insertion of the binding-cords, and with hooks or other suitable fastenings for keeping the molds closed and locked when removing them from the press and until the binding-strings are tied, during which operation other molds may be successively inserted in the press for a continuation or repetition of the process.

Reference is to be had to the accompanying drawings, forming part of this specification, in which similar letters of reference indicate corresponding parts in all the figures.

Figure 1:
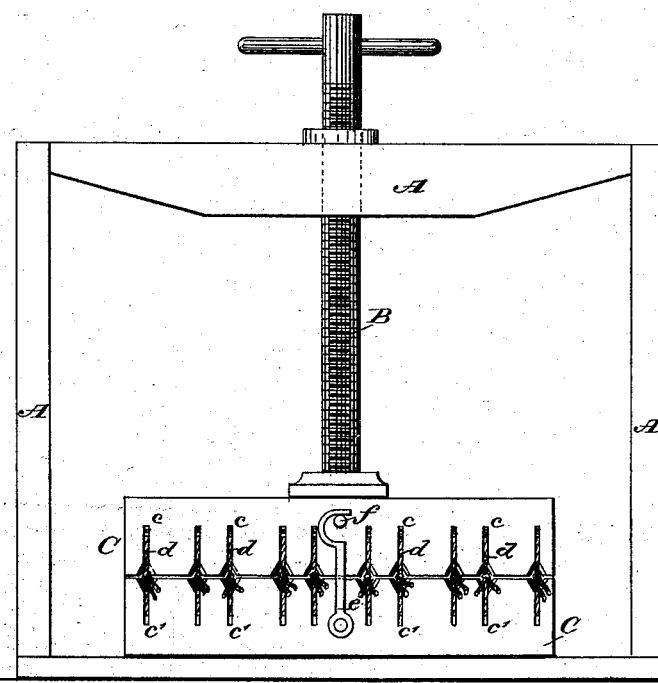
Figure 2:
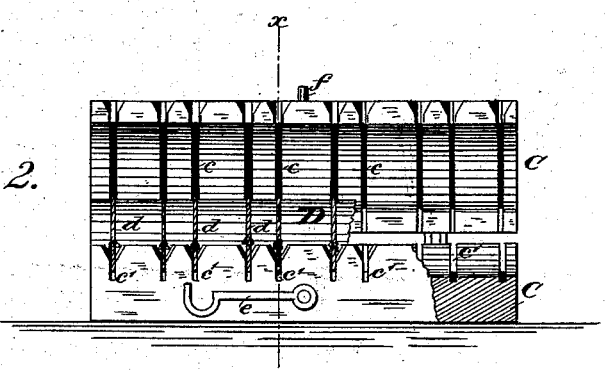
Figure 3:
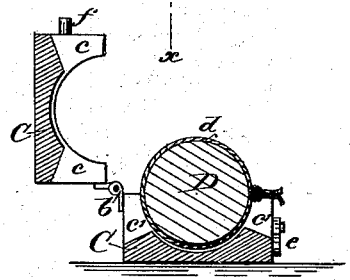

Figure 1 represents a side elevation of an ordinary screw-press with a mold therein as locked by its fastening before removing it to tie the binding-strings. Fig. 2 is a longitudinal view of said mold as thrown open after its removal from the press and after the binding-strings have been tied, the fish or contents of the mold being represented as broken away; and Fig. 3 is a transverse section of the same on the line $x\ x$.

A in the drawings indicates the frame, and B the screw, of an ordinary screw-press. Any other suitable kind of press, however, may be used.

C is one of the molds, which is of cylindrical contour on its interior, and is constructed of an upper and lower section hinged together along one side, as at $b$. These mold-sections have corresponding transverse internal grooves, $c\ c'$, in them, extending through their backs and fronts for reception of the binding-strings $d$, and are provided on their fronts with one or more fastening hooks and catches, $e\ f$, or other suitable locking devices.

Before inserting the fish D the mold is opened to its fullest extent, as in Fig. 2, and the strings are introduced through the grooves $c\ c'$ and through both sections, the ends of the strings projecting from both sections. Then the dried fish or other material is placed about equally in both sections, which are closed one upon the other. Power is then applied to the press to further or completely close the mold and compress the fish, after which the hook $e$ is made to engage with the catch $f$ to hold the mold locked, so that said mold, with the fish in it under pressure, may be removed from the press and the binding-strings $d$ afterward be tied to hold the compressed fish firmly in the form of package into which it has been pressed. The hook $e$ is then released, the mold opened, and the package removed.

By this process or method of operating, and by employing a number of similar molds, the same press may be kept almost constantly at work, each locked mold as it is removed for the tying of its binding-strings being replaced by another.

By this process, too, of putting up the fish, uniform packages of marketable size—say five pounds in weight, more or less—may be readily produced, and as most of the air has been forced out from between the pieces of fish there is less tendency of the article to spoil in hot weather or on long voyages, especially when one or more preservative wrappers are used.

Having thus fully described my invention, I claim as new and desire to secure by Letters Patent—

The fish-compressing mold C, constructed of two longitudinal sections hinged together on their one side, and of cylindrical contour on their interior, with a series of transverse grooves, $c c'$, in and through them for the reception of binding-strings or cords, in combination with one or more hooks and fastenings, $e\ f$, for holding the molds locked with the fish under pressure, substantially as and for the purposes herein set forth.

JAMES H. BAXTER.

Witnesses:
C. H. LEIGHTON,
A. H. HARDING.